Feb. 8, 1949.                A. E. LITTLE                2,460,994
                      PHOTOGRAPHIC FILM PACK ADAPTER
Filed Oct. 23, 1946                                 2 Sheets-Sheet 1
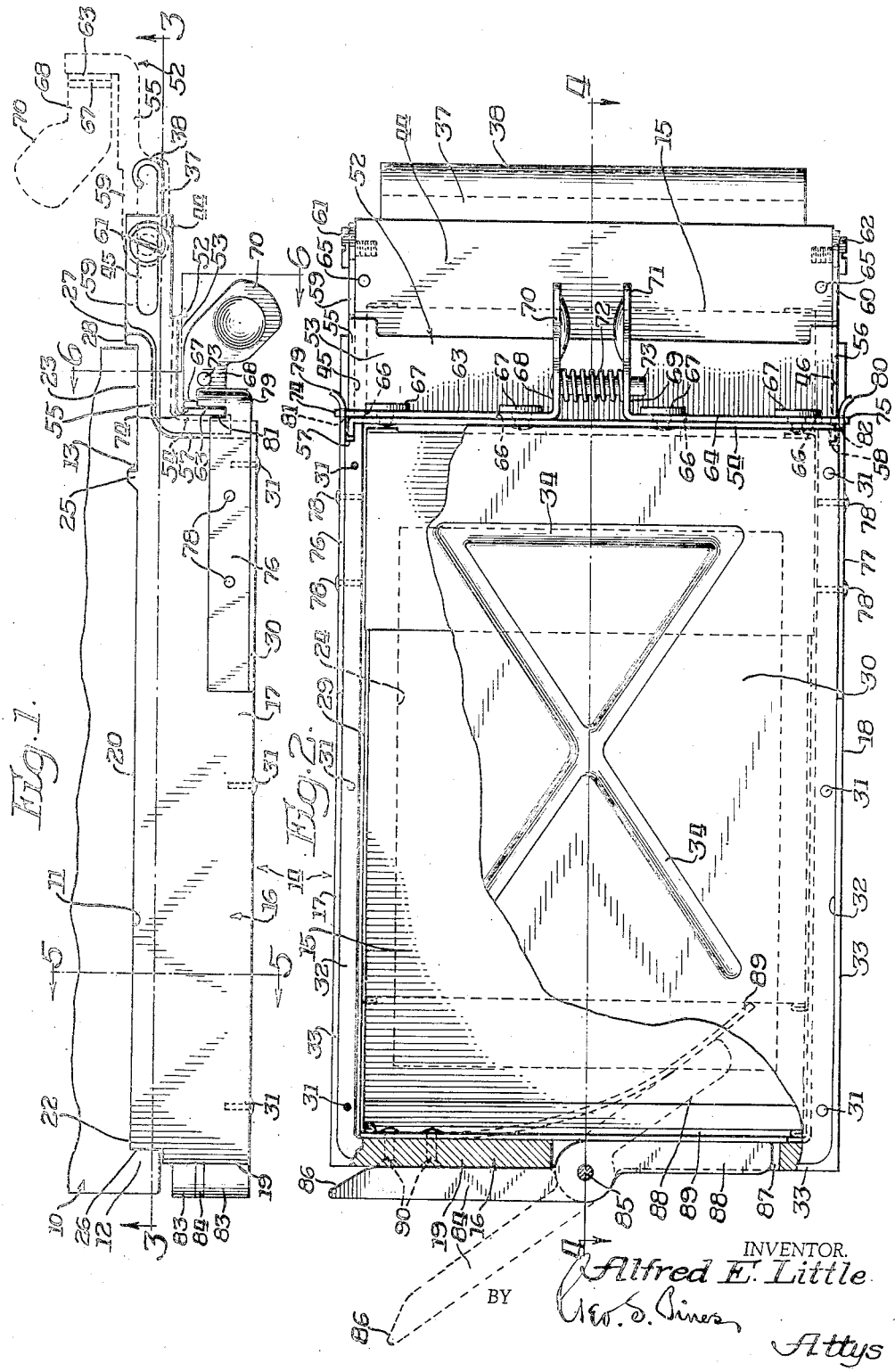
INVENTOR.
Alfred E. Little
BY
Attys Feb. 8, 1949.  A. E. LITTLE  2,460,994
PHOTOGRAPHIC FILM PACK ADAPTER
Filed Oct. 23, 1946  2 Sheets-Sheet 2
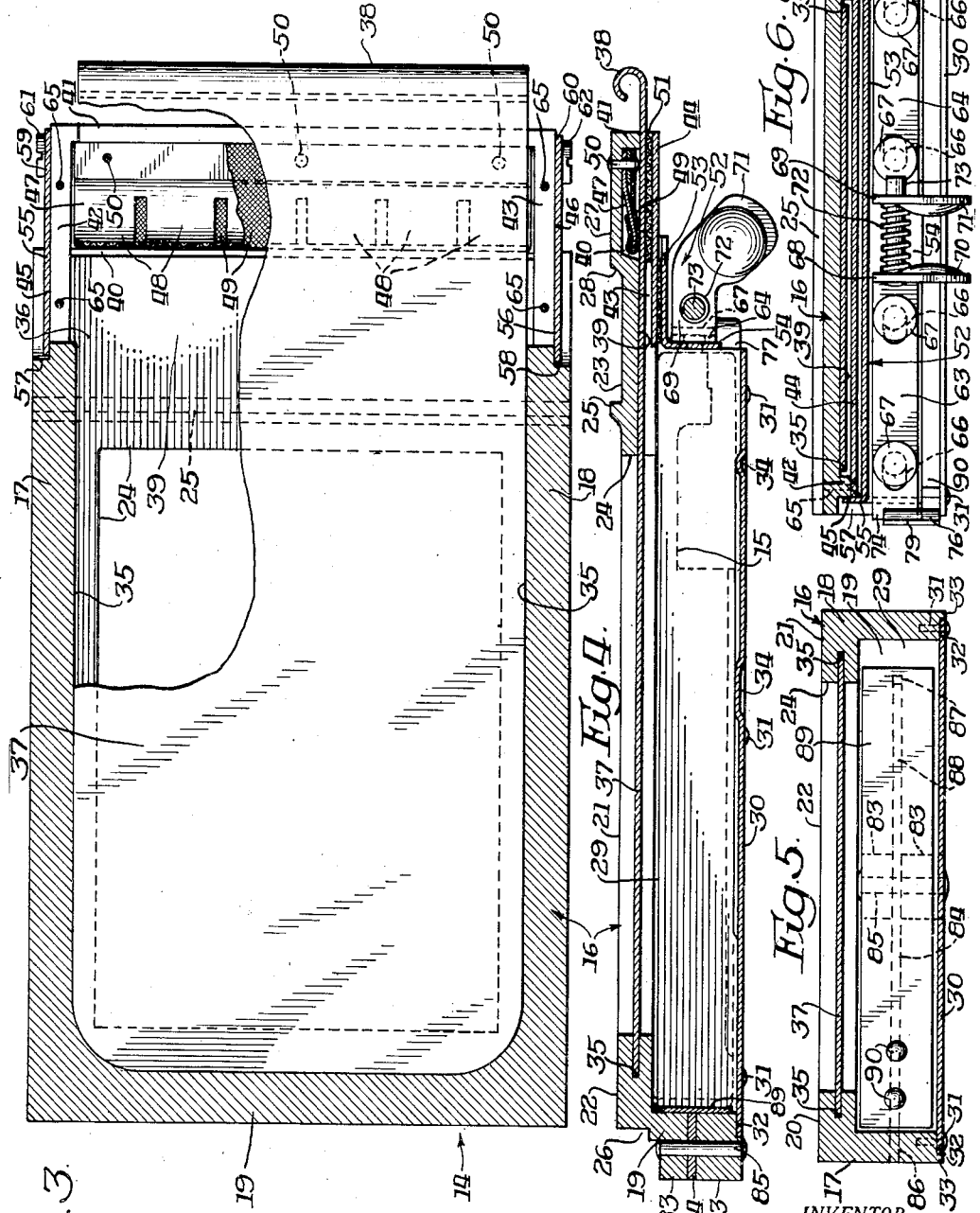
INVENTOR.
Alfred E. Little.
BY
Attys Patented Feb. 8, 1949

2,460,994

UNITED STATES PATENT OFFICE 2,460,994

PHOTOGRAPHIC FILM PACK ADAPTER

Alfred E. Little, Chicago, Ill., assignor to Busch Precision Camera Corporation, Chicago, Ill., a corporation of Illinois Application October 23, 1946, Serial No. 705,047

7 Claims. (Cl. 95—22)

This invention relates to photographic film pack adapters for use with cameras whereby a number of sensitive photographic film members may be consequently positioned at the focal plane, exposed, and stowed without the necessity of manipulating a film holder after each exposure.

Instead of utilizing one or two film members as in the case of the ordinary cut film holder intended for use with the ordinary bellows type, ground glass viewing camera, it is often convenient and more efficient for the camera operator to use a commercially available film pack. This film pack contains a considerable number of film members in such association with paper tabs and masking paper members that when the pack is positioned on the back of the camera at the focal plane thereof, successive members of the sensitized film may be positioned for exposure by the manipulation of certain paper tabs provided at the side of the pack.

In order to position the pack so that the film members when positioned will be in light-free exposable condition, a holder of some kind must be used in order to adapt the pack to the rear of the camera at the position normally occupied by the cut film holder.

Heretofore film pack holders or adapters have been used in which a chamber is provided in a member which may be associated with the back of the camera, the front of said chamber having an opening facing the camera lens and covered by a removable mask, while the rear of said chamber is covered with some manner of swinging door whereby the pack may be introduced thereinto. The difficulty of using such holders is that once the pack has been installed in the chamber it is difficult to remove. Either the camera must be turned with the adapter facing downwardly so that the pack can be shaken out, or else the entire adapter must be removed in order to remove the pack therefrom. Other disadvantages of previous adapters have included difficulty of inserting the pack due to the necessity of constructing the holder to exclude light, and inconvenience and inefficiency of construction giving rise to inefficient use, and loss of time and photographic opportunity.

This invention eliminates all of the above difficulties in providing a novel and improved film pack adapter in which the structure promotes efficiency in the operation of the camera; enables photographs to be quickly taken; and enables the film pack to be quickly inserted or removed from the back of the camera dark chamber without the necessity of moving the camera or the adapter itself.

Other objects of the invention have been to provide a novel film pack holder which is economically constructed and which is simple and "foolproof" in operation; to provide a film pack adapter in which the film pack is introduced at the side of the holder and latched in place in a novel manner and wherein when it is desired to remove the pack the unlatching of the holding means enables the operator to eject the pack from the holder a substantial distance so that it can be grasped and removed in entirety.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this inventon, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a fragmentary plan view of a camera showing a film pack adapter embodying the invention positioned on the rear thereof.

Fig. 2 is a view of the rear face of the adapter, having a film pack associated therewith, with portions of the view being cut away to show certain details.

Fig. 3 is a sectional view taken through the adapter along the line 3—3 of Fig. 1 and in the direction indicated, with portions broken away to show the interior construction thereof.

Fig. 4 is a sectional view of my new adapter taken along the line 4—4 of Fig. 2 and in the direction of the arrows.

Fig. 5 is a transverse sectional view taken through the adapter along the line 5—5 of Fig. 1 and looking towards the left end thereof.

Fig. 6 is a similar view partly in section and partly in elevation taken along the line 6—6 of Fig. 1.

The reference character 10 designates a camera body having a dark chamber, the rear wall 11 of which is substantially at the focal plane of the lens so that a ground glass viewing screen will have produced thereon an image of the field viewed by the lens, or a photographic film positioned at such rear wall may be adapted to expose such image.

The rear wall of the camera is provided with a limiting stop 12 and a placement groove 13 so that a film holder may be properly positioned thereagainst. There is shown, instead of a film holder, a photographic film pack adapter designated generally by the reference character 14 adapted to be positioned on the wall 11 of the camera 10 so that the successive film members of a conventional film pack 15 associated with said adapter may be consecutively exposed. The invention lies in the novel construction of the adapter. The conventional member pressing the adapter 14 against the camera is not shown.

The adapter 14 comprises a frame member 16 having top and bottom walls 17 and 18 and an end wall 19 on the left end thereof as viewed in the drawings. There is no wall on the right end of the frame member 16 in order that a film pack 15 may be inserted into the chamber formed by the frame member 16 as will be presently explained. The face of the frame member 16 is adapted to be engaged against the rear wall 11 of the camera 10 and as such is provided at the top, bottom and both ends with framing surfaces 20, 21, 22, and 23 respectively, whereby a substantially rectangular window 24 is formed thereby, said window being arranged to register with the rear opening of the dark chamber of the camera 10 when said adapter 14 is associated therewith.

The right hand framing surface 23 has a protuberance 25 formed along the length thereof and transversely of the frame member 16 for cooperation with the groove 13 of the camera 10 for aiding in positioning the adapter on the camera wall 11. The left hand framing surface 22 is comparatively narrow as shown due to the cut back step 26 formed on the left end wall 19 for engagement with the stop 12 of the camera. The right hand framing surface 23 is also provided with an extended portion 27 which is slightly thicker than the wall of the frame member 16 at the framing surfaces, thereof thereby providing a lip 28 adapted to engage the right hand edge of the camera wall 11 and also to provide sufficient space on the interior of said wall for a light trap, to be described.

The frame member 16 forms on the interior thereof a film pack chamber 29 access to which, as thus far described, is had by way of the front and rear of the member 16, as well as by way of the right hand end of the member 16. The rear of the chamber 29 is closed off permanently by means of a sheet member 30, preferably of metal, riveted to the frame member by means of rivets 31 or the like. In the embodiment shown the frame member is formed of some type of plastic and the member 30 is set into the frame member to provide a smooth flush surface on the rear of the adapter 14. The recess 32 for the member 30 is thus cut into the frame member 16 with a framing lip 33 thereabout. The member 30 has been provided with an upset design 34 the protruding side of which is on the inside of the member 16 and thereby is formed on the inner surface of the member 30 which provides the rear face of the chamber 29. The protruding design 34 thus offers bearing points serving to hold the film pack 15 away from the inner surface of the member 30 when said pack is inserted, thereby minimizing friction between the face of said pack and the inner surface of the member 30.

The front of the framing member 16 is open to the chamber 29 by reason of the window 24 which has been described. A groove 35 is cut in the frame member 16 spaced inwardly of the framing surfaces 20 to 23, said groove extending beyond the extent of the window 24 on the top, bottom, and left thereof, but being continuous to the open end of the chamber 29 on the right hand end thereof as indicated at 36. The groove 35 is provided with a masking member 37 which is adapted to slide into the same and thereby close off the chamber 29 from light entering by way of the window 24. The masking member shown has a curled edge 38 by means of which same may be manipulated.

In connection with the description of the groove 35 attention is directed to Fig. 3 which is a sectional view taken transversely through the adapter 14 at the position of the mask 37, along the groove 35. The surface designated by the character 39 is directly below the framing surface 23. A recess 40 is formed in the surface 39 transversely of the member 16, said recess terminating short of the extreme right hand edge of the member 16, forming thereby the right hand wall 41 of said recess. The surface 39, and wall 41 are both aligned with the groove 35 so that the mask 37 may readily slide into the groove to its extreme position. At the top and bottom of the surface 39 and wall 41 there are provided raised ledges 42 and 43, both of substantially the same thickness as the mask 37. A sheet member 44 of rectangular shape bridges the surface 39, recess 40, and wall 41 between these ledges and is held in place by rivets 65 or the like. It should be noted that the dimension of the member 44 across the adapter 14 is less than the overall width of the framing member 16 whereby the ends of the same are below the surfaces of the top and bottom walls 17 and 18 respectively. There is formed thereby recessed surfaces 45 and 46 in either wall 17 and 18 respectively at the ends of the member 44 for a purpose presently to be described.

Within the recess 40 there is provided a light entrapping device which consists of a metal spring member 47 having a plurality of equalizing fingers 48, the whole being covered with dark cloth 49 and held in position by means of the rivets 50. The fingers 48 are normally urged in a downward direction as viewed in Fig. 4 whereby they tightly engage against a surface of the masking member 37, or, if same is not in position, against the inner surface of the member 44. The inner surface of the member 44 is provided with a cloth member 51 glued thereto for cooperating with the light entrapping device in excluding light from the chamber 29.

The device as thus far described consists of a framing member 16 forming a chamber 29 therein and adapted to receive a film pack thereinto. The rear of the member is permanently closed off and the front of the member is provided with a window 24 which is closed off by a removable mask 37. The right hand end of the chamber 29 which end is designated 36 is uncovered.

There is provided at the right end of the adapter 14 a cover member generally designated by the reference character 52 for the purpose of closing off the open end 36 of the chamber 29, and yet capable of being moved to a position where the opening is unobstructed so that the pack 15 may be inserted into the chamber 29 and latched into a light-free position whereby the film members thereof may be exposed as desired. The member 52 is so constructed that when the pack 15 is latched in position, the paper tabs by means of which same is operated may be easily manipulated.

The latching cover 52 consists of a member of generally right angle cross section, the portion 53 adapted to overlie the member 44 while the portion 54 is adapted to cover the opening 36 leaving a narrow space at the top thereof through which the paper tabs of the pack will extend. The ends of the latching cover 52 are flanged forming the lips 55 and 56. The walls 17 and 18 have portions of the surfaces thereof cut back as far as the surfaces 45 and 46 and acting as continuations thereof as shown at 57 and 58. The cut back portions 57 and 58 together with the surface portions bordering the surfaces 45 and 46 are shaped to substantially conform to the shape of the lips 55 and 56. By means of the overhanging lips 55 and 56 the latching cover 52 will engage over the opening 36 in such a manner that no light can enter through the covered portion. An extension of the lips 55 and 56 on either end of the cover 52 is widened and slotted to provide ears 59 and 60 which slide along surfaces 45 and 46 respectively. Screws 61 and 62 held in surfaces 45 and 46 engage respective ears 59 and 60 and provide rotating and sliding engagement therewith. By reason of this manner of attachment it can be seen that the cover 52 may be moved to the right and then rotated out of the path of a film pack 15 being either inserted or withdrawn from the chamber 29. The latter position of the cover 52 is shown by the dotted lines of Fig. 1.

The portion 54 of the cover 52 is provided with sliding members 63 and 64 each of which is provided with slots 66 and is held in position by headed pins 67 engaging said slots and fastened to said portion 54. The inner ends of the sliding members 63 and 64 are provided with right angle bends forming the ears 68 and 69, said ears each having a downwardly directed portion provided with a finger engaging indentation, forming thereby the grasping levers 70 and 71 which are adapted to be seized between two fingers and pinched together for the purpose of sliding members 63 and 64 inwardly of the sides of the adapter and towards one another. Such motion is opposed by means of a coiled spring 72 positioned on a pin 73 carried between the ear portions 68 and 69. The extent of movement of the sliding members 63 and 64 is governed by the length of the slots 66.

The free ends of the members 63 and 64 are adapted to slightly protrude beyond the edges of the adapter as shown at 74 and 75. On either side of the frame member 16 and attached to the walls 17 and 18 on the surfaces thereof there are provided leaf spring members 76 and 77 respectively. These members are attached to the adapter by means of the rivets 78 and have the free ends thereof bent up and widened as shown at 79 and 80 forming thereby resilient tabs. Each of the leaf spring members is provided with a slot 81 and 82 adjacent the resilient tabs and so positioned that the free ends 74 and 75 of the respective members 63 and 64 may engage therein and be held thereby. Thus it will be seen that the cover 52 may be placed upon the member 44 just short of its final position and moved to the left. As it slides along, the ends 74 and 75 engage respectively against the resilient tabs 79 and 80, are moved inwardly against the force of the spring 72 until the slots 81 and 82 are reached. At this point the ends 74 and 75 are free and the members 64 and 65 spring outwardly by reason of the spring 72 and the cover 52 is latched in final position.

In case it is desired to remove the film pack 15, the levers 70 and 71 are pinched between the fingers thereby unlatching the cover 52 which is moved out of the path of the pack. The ejecting mechanism of the adapter is then caused to move the pack out of the chamber 29. The left hand wall 19 of the framing member 16 is provided with a hub 83 formed thereon, in which is journaled a lever member 84 by means of the pin 85. One end of the lever member 84 is adapted to be lifted as for example by grasping same with the finger at 86, while the other end of the lever member 84 is adapted to enter a slot 87 provided in the wall 19 and move into the chamber 29. This latter end of the lever member 84 is designated 88. When in quiescent position, the lever 84 is arranged substantially parallel to the wall 19, and is held in position by means of a leaf spring 89 attached to the inner surface of the wall 19 by rivets 90. When the lever member 84 is manipulated to move same to the position shown by the broken lines of Fig. 2, the bottom of the film pack is engaged and the pack 15 is pushed out of the chamber 29 to a position shown by the broken lines of Fig. 2. In this position the pack may be grasped by the fingers and removed entirely from the adapter without the necessity of disturbing the position of the adapter on the camera or without disturbing the position of the camera. It should be seen that when the leaf spring is in its quiescent position against the inner surface of the wall 19, it serves as a light trap to prevent light from entering the chamber 29 through the slot 87.

When the cover 52 is in position, there is sufficient space between the edge of the portion 54 and the member 39 to permit the tabs associated with the pack to protrude so that same may be manipulated while operating the camera.

It is thus seen that there has been provided a novel and improved photographic film pack adapter which is capable of being attached to the rear of a camera and whereby film packs may be inserted and used and removed without the necessity of disturbing either the position of the camera or the placement of the adapter on the camera. It should also be seen that the device is simple in construction and positive in operation.

It is believed that this invention its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What it is claimed and desired to secure by Letters Patent of the United States is:

1. A photographic film pack adapter comprising a frame member having means forming a light free chamber therein and adapted to receive therein a photographic film pack, means for permitting photographic images to be exposed by the film members of said pack, said frame having an open end permitting introduction of said pack from one end of said adapter in sliding movement into said chamber, and means for latching said pack in exposable position whilst excluding light from said chamber, comprising a member movable from a position out of the path of said pack while same is engaged in sliding movement into the chamber to a position against the end of said pack and over said open end after said pack has been seated, said frame member having means for ejecting said pack when said movable member is positioned out of the path of said pack, said ejecting means comprising a spring-opposed lever movable into engagement with said pack for moving same and operable from externally of said adapter, said frame member having means permitting access by said lever, said access means being light-insulated by said opposing spring.

2. A photographic film pack adapter comprising a unitary casing having a chamber therein adapted to receive a film pack and having a relatively thin rectangular box-like configuration, said casing having one face provided with an opening having a removable mask adapted to permit exposure of said film pack when said adapter is associated with a camera, one end of said casing being open to permit access of said pack by sliding same endwise into said open end along a path substantially defined by the planes of the opposite faces of the casing, and an end wall for closing said open end pivoted on hinged means, the axis of which is offset from the path, means for moving said hinged means along the path whereby said end wall may be translated relative to the open end prior to rotating same completely out of said path.

3. A photographic film pack adapter comprising a unitary casing having a chamber therein adapted to receive a film pack and having a relatively thin rectangular box-like configuration, said casing having one face provided with an opening having a removable mask adapted to permit exposure of said film pack when said adapter is associated with a camera, one end of said casing being open to permit access of said pack by sliding same endwise into said open end along a path substantially defined by the planes of the opposite faces of the casing, and an end wall for closing said open end pivoted on hinged means, the axis of which is offset from the path, means for moving said hinged means along the path whereby said end wall may be translated relative to the open end prior to rotating same completely out of said path, said pack being of the type having tabs, and said pivoted end wall having a space for permitting manipulation of the tabs while said end wall is in position against the open end.

4. A photographic film pack adapter comprising a unitary casing having a chamber therein adapted to receive a film pack and having a relatively thin rectangular box-like configuration, said casing having one face provided with an opening having a removable mask adapted to permit exposure of said film pack when said adapter is associated with a camera, one end of said casing being open to permit access of said pack by sliding same endwise into said open end along a path substantially defined by the planes of the opposite faces of the casing, and an end wall for closing said open end pivoted on hinged means, the axis of which is offset from the path, means for moving said hinged means along the path whereby said end wall may be translated relative to the open end prior to rotating same completely out of said path, the pivoted end wall and the casing having cooperative means whereby the said end wall may be removably latched to the casing in closing position.

5. A photographic film pack adapter comprising a unitary casing having a chamber therein adapted to receive a film pack and having a relatively thin rectangular box-like configuration, said casing having one face provided with an opening having a removable mask adapted to permit exposure of said film pack when said adapter is associated with a camera, one end of said casing being open to permit access of said pack by sliding same endwise into said open end along a path substantially defined by the planes of the opposite faces of the casing, and an end wall for closing said open end pivoted on hinged means, the axis of which is offset from the path, means for moving said hinged means along the path whereby said end wall may be translated relative to the open end prior to rotating same completely out of said path, said casing having ejector means for expelling the pack after use thereof, including a lever pivoted to the casing at the end opposite the open end and serving to be manipulated from externally of said casing to push the pack out of the open end.

6. In a film pack adapter in which a relatively thin rectangular box-like container is adapted to be arranged with one face against the rear of a camera and in which one end thereof is open for the introduction of the film back therein along a path substantially defined by the faces of said container, the herein invention which comprises a latching member adapted to removably cover the open end mounted on pivots, the pivots being slidable relative to the opening whereby the latching member may be translated from the opening along said path and then rotated completely out of said path.

7. In a film pack adapter in which a relatively thin rectangular box-like container is adapted to be arranged with one face against the rear of a camera and in which one end thereof is open for the introduction of the film pack therein along a path substantially defined by the faces of said container, the herein invention which comprises a latching member adapted to removably cover the open end mounted on pivots, the pivots being slidable relative to the opening whereby the latching member may be translated from the opening along said path and then rotated completely out of said path, said container having an extension on the open end thereof on the side of said path adjacent to the camera, said extension having slots mounting said pivots and said latching member being adapted to be translated and rotated as aforesaid to a position on the side of said extension opposite to said open end.

ALFRED E. LITTLE.

REFERENCES CITED

The following references are of record in the file of this patent:

UNITED STATES PATENTS

| Number | Name | Date |
|---|---|---|
| 674,432 | Brehm | May 21, 1901 |
| 987,620 | Glover | Mar. 21, 1911 |
| 1,073,442 | Schmid | Sept. 16, 1913 |
| 1,260,596 | Thrasher | Mar. 26, 1918 |
| 1,291,004 | Hutchings | Jan. 14, 1919 |
| 2,353,895 | Steiner | July 18, 1944 |